(12) United States Patent
Bou-Mezrag et al.

(10) Patent No.: US 10,493,685 B2
(45) Date of Patent: Dec. 3, 2019

(54) MOULD FOR A CLIPPABLE BOTTLE

(71) Applicant: BTC CONCEPT, Paris (FR)

(72) Inventors: Mohammed Seiffeddine Bou-Mezrag, Villeneuve la Garenne (FR); Yann-Loïg Bassing, Villejuif (FR)

(73) Assignee: BTC CONCEPT, Paris (FR)

( * ) Notice: Subject to any disclaimer, the term of this patent is extended or adjusted under 35 U.S.C. 154(b) by 224 days.

(21) Appl. No.: 15/310,167

(22) PCT Filed: May 18, 2015

(86) PCT No.: PCT/FR2015/051283
§ 371 (c)(1),
(2) Date: Nov. 10, 2016

(87) PCT Pub. No.: WO2015/177443
PCT Pub. Date: Nov. 26, 2015

(65) Prior Publication Data
US 2017/0136680 A1 May 18, 2017

(30) Foreign Application Priority Data

May 19, 2014 (FR) .................................... 14 54447

(51) Int. Cl.
*B29C 49/48* (2006.01)
*B29C 49/54* (2006.01)
*B29C 49/06* (2006.01)

(52) U.S. Cl.
CPC ............ *B29C 49/48* (2013.01); *B29C 49/541* (2013.01); *B29C 49/06* (2013.01); *B29C 2049/4892* (2013.01); *B29C 2049/548* (2013.01)

(58) Field of Classification Search
CPC .................. B29C 49/48; B29C 49/541; B29C 2049/4892; B29C 2049/548
(Continued)

(56) References Cited

U.S. PATENT DOCUMENTS 3,757,718 A * 9/1973 Johnson .................. B21C 23/00
264/292
3,843,088 A * 10/1974 McLoughlin .......... B29C 45/33
249/144

(Continued)

FOREIGN PATENT DOCUMENTS

EP 1163996 A2 12/2001
EP 1321370 A1 6/2003

OTHER PUBLICATIONS

International Search Report dated Sep. 7, 2015 in corresponding Application No. PCT/FR2015/051283; 7 pgs.

*Primary Examiner* — Joseph S Del Sole
*Assistant Examiner* — Emmanuel S Luk
(74) *Attorney, Agent, or Firm* — Maier & Maier, PLLC

(57) ABSTRACT

The invention relates to a base for a mould, for a clippable bottle, comprising, on the upper face thereof, a wall for moulding the bottom of the container to be produced, from which a head extends along a longitudinal axis A2, said head comprising a peripheral surface comprising at least one blind opening, characterised in that the portion of said peripheral surface in line with said blind opening can move between a forward position, wherein said portion is aligned with the rest of said peripheral surface, and a rear position, wherein said portion is set back from the axis parallel to the axis A2 and passing through the bottom of said blind opening.

9 Claims, 7 Drawing Sheets

(58) Field of Classification Search
USPC .................................................. 425/DIG. 58
See application file for complete search history.

(56) References Cited

U.S. PATENT DOCUMENTS

| | | | | | |
|---|---|---|---|---|---|
| 3,843,286 | A * | 10/1974 | Horberg, Jr. | ............ | B29C 49/56 425/183 |
| 3,856,450 | A * | 12/1974 | Britten | .................. | B29C 49/541 425/398 |
| 3,861,845 | A * | 1/1975 | Butcher | .............. | B29C 49/4817 425/531 |
| 3,905,740 | A * | 9/1975 | Lovejoy | .................. | B29C 45/33 249/63 |
| 4,036,926 | A * | 7/1977 | Chang | .................... | B29C 49/541 264/534 |
| 4,130,264 | A * | 12/1978 | Schroer | ............... | B29C 45/4421 164/345 |
| 4,414,175 | A * | 11/1983 | Rainville | ................ | B29C 49/14 264/531 |
| 4,456,214 | A * | 6/1984 | Ruck | .................... | B29C 33/485 249/144 |
| 4,533,312 | A * | 8/1985 | Von Holdt | .......... | B29C 45/4421 249/142 |
| 4,541,605 | A * | 9/1985 | Kubota | ............... | B29C 45/4421 249/142 |
| 4,615,667 | A * | 10/1986 | Roy | .................... | B29C 49/0073 264/526 |
| 4,695,421 | A * | 9/1987 | Takeda | ................ | B29C 45/4421 249/178 |
| 4,803,024 | A * | 2/1989 | Nilsson | .................... | B29C 55/30 264/80 |
| 4,915,609 | A * | 4/1990 | Hahn | .................... | B29C 33/485 249/116 |
| 4,919,608 | A * | 4/1990 | Catalanotti | ........... | B29C 33/485 249/176 |
| 4,927,591 | A * | 5/1990 | Nilsson | .................... | B29C 49/08 264/532 |
| 5,122,325 | A * | 6/1992 | Bartley | ............... | B29C 49/0073 264/531 |
| 5,122,327 | A * | 6/1992 | Spina | ...................... | B29C 49/30 215/381 |
| 5,255,889 | A * | 10/1993 | Collette | ................ | B29C 33/306 249/102 |
| 5,403,179 | A * | 4/1995 | Ramsey | .............. | B29C 45/4421 264/318 |
| 5,511,966 | A * | 4/1996 | Matsui | .................... | B29C 49/48 249/117 |
| 5,776,521 | A * | 7/1998 | Wright | .................. | B29C 45/262 264/318 |
| 5,820,807 | A * | 10/1998 | Urmston | ............. | B29C 45/4005 264/318 |
| 6,074,596 | A * | 6/2000 | Jacquet | ............... | B29C 49/4802 264/529 |
| 6,153,145 | A * | 11/2000 | Desoutter | ............... | B29C 49/18 264/521 |
| 6,635,217 | B1 * | 10/2003 | Britton | .................. | B29C 49/541 215/373 |
| 6,929,462 | B1 * | 8/2005 | Andrews | .............. | B29C 33/303 425/450.1 |
| 7,157,037 | B2 * | 1/2007 | Seidelman | ............ | B29C 45/262 249/59 |
| 7,293,341 | B2 * | 11/2007 | Zydron | ............... | B29C 45/4421 29/450 |
| 7,658,882 | B2 * | 2/2010 | Minganti | .............. | B29C 43/361 264/322 |
| 8,002,538 | B2 * | 8/2011 | Zydron | ............... | B29C 45/4421 249/178 |
| 8,313,686 | B2 * | 11/2012 | Beuerle | ............... | B29C 49/4815 264/524 |
| 8,747,727 | B2 * | 6/2014 | Trude | .................. | B65D 23/102 215/384 |
| 8,881,937 | B2 * | 11/2014 | Derrien | ................ | B65D 1/0261 220/675 |
| 9,011,138 | B2 * | 4/2015 | Hickok | ............... | B29C 45/4421 425/443 |
| 9,022,776 | B2 * | 5/2015 | Guerin | ................ | B29C 49/4815 425/522 |
| 9,085,387 | B2 * | 7/2015 | Kurihara | ............... | B65D 1/0276 |
| 9,808,975 | B2 * | 11/2017 | Chappel | ............ | B29C 45/4421 |
| 9,878,816 | B2 * | 1/2018 | Melrose | ............... | B65B 7/2835 |
| 2006/0096942 | A1 | 5/2006 | Lane | | |
| 2006/0231985 | A1 * | 10/2006 | Kelley | ................ | B29C 49/4802 264/523 |
| 2008/0283533 | A1 * | 11/2008 | Tilton | .................. | B29C 49/541 220/506 |
| 2012/0261428 | A1 * | 10/2012 | Eble | .................... | B29C 49/4802 220/600 |
| 2014/0027336 | A1 | 1/2014 | Bou Mezrag et al. | | |
| 2014/0123603 | A1 * | 5/2014 | Denner | .................... | B67C 3/045 53/440 |
| 2014/0312538 | A1 * | 10/2014 | Wilson | .................. | B29C 49/185 264/534 |
| 2014/0374965 | A1 * | 12/2014 | Tanaka | .................... | B29C 49/14 264/523 |
| 2017/0072617 | A1 * | 3/2017 | Maki | ...................... | B29C 49/28 |
| 2017/0190097 | A1 * | 7/2017 | Van Dijck | ............... | B29C 49/06 |

* cited by examiner

MOULD FOR A CLIPPABLE BOTTLE

TECHNICAL FIELD

The invention relates to the field of blow-moulding using a preform, in order to manufacture a necked container comprising an undercut. The container is more particularly a module for a receptacle composed of a plurality of such containers, which are arranged for the axial junction thereof to each other with the engagement between the bottom of a container and the neck of another axially adjacent container. The invention notably relates to a mould for manufacturing a preform by blow-moulding in order to obtain such a container comprising an undercut arranged in the bottom thereof, the manufacturing method implementing said mould and a receptacle composed of a plurality of containers manufactured using the implementation of this method.

PRIOR ART

Among the containers, necked containers are known which are arranged as a bottle or similar and which are intended to contain liquid products, beverages in particular. Such containers comprise at the proximal end thereof a neck of tubular shape, which is provided with easily reversible junction means, by screwing in particular, with a removable cap. The neck is extended towards the distal end of the container by a flared section, then axially by a body which is closed at the base thereof by a bottom arranged at the distal end thereof.

It is common to form such containers by blow-moulding by using a preform installed inside a mould. This moulding technique is advantageous for obtaining containers with a thin wall at least cost and at high production rates. The mould is primarily composed of at least two lateral shells and of a bottom. The shells are laterally mobile for the opening and the closing of the mould, and comprise at the top thereof a member for engaging a flange provided in the preform for securing same inside the mould during the blow-moulding operation. The bottom of the mould is suitable for being axially mobile in order to form the open cavity comprised by the bottom of the container.

Receptacles have been proposed composed of a plurality of necked containers that can be assembled axially with an engagement between the bottom of an upper container and the neck of a lower container. The bottom of the upper container comprises a cavity which houses the neck extended by the flared section of the lower container, this cavity comprising a tubular space for receiving said neck which is extended by a flared pocket. The assembly between the upper container and the lower container is obtained by engagement between engaging axial nesting members comprised by the containers respectively. In the assembly position of the containers, a nesting member of the lower container is embedded inside a nesting member of complementary shape comprised by the upper container. This embedding is obtained by elastic deformation of one and/or the other of the nesting members, and prohibits spontaneous separation of the containers under the effect of the weight of the lower container, in particular when the receptacle is carried by means of the upper container. To assemble or separate the containers, the operator exerts a force in order to induce deformation of one and/or of the other of the nesting members and the engagement thereof or conversely the disconnection thereof.

The applicants have developed (FIGS. 1 and 2) a modular receptacle (described in WO2012104499A2) composed of necked containers comprising modalities for axial nesting into one another by engagement between the bottom and the neck thereof. This axial nesting between the containers can be obtained at least cost and at high production rates by blow-moulding a preform made of thermoplastic material, despite the thinness of the wall thereof sought to be as thin as possible through material sparing, and despite the presence of an undercut useful for the formation of a nesting member comprised by the containers.

More particularly, said modular receptacle is composed of a plurality of necked containers 1 suitable for axial nesting successively with one another with engagement between the bottom 2 and the neck 3 thereof extended by a flared section 4, the containers 1 comprising axial nesting members 11, 12, 16, 17 with an adjacent container, of which at least one is arranged as a flange 11 arranged around the neck 3 of a container 1 and of which at least one other is arranged as a recess for receiving the flange 11, said recess that comprises a cavity 8 open to the exterior which is arranged in the bottom 2 of the containers 1 and which comprises a blind tubular space 9 for receiving a neck 3 extended by a flared pocket 10 for receiving the flared section 4 extending this neck 3, the recess is formed by the tubular space 9 which is arranged as an undercut in the bottom 2 of the container 1, this tubular space forming a chamber 9 for receiving the flange 11 with radial freedom and bearing axially in one direction against a shoulder 12 formed at the base of the chamber 9 opposite the blind surface 15 thereof.

The prior art includes a manufacturing method (WO2012104499A2) via moulding the latter container with undercut by blow-moulding a preform, the implementation whereof is compatible with obtaining a container with a thin wall which is organised in order to allow for reliable and comfortable axial nesting thereof with a similar container in order to compose the modular receptacle. This manufacturing method implements a mould as described in FIGS. 3-5.

This mould 101 comprises shells 102 which are laterally movably mounted around an axis A2 of general orientation of the mould 101 in line with the axis (A1) of general extension of the container 1 to be obtained, and a base 103 which is axially movably mounted along this axis A2 of general orientation of the mould 101. The shells 102 each comprise a hollow cavity 104 separating a half-wall of the container 1 to be obtained. Cells 105 for moulding bosses 17 on the flared neck 4 of the containers 1 to be obtained are formed in the zone corresponding to the top of these hollow cavities 104. The shells 102 comprise at the top thereof a rabbet 106 or similar member for gripping and securing a preform inside the mould 101, by means of a ring comprised by the preform for this purpose. The base 103 is provided with means for forming the cavity 8 in the bottom 2 of the container 1 to be obtained, associating an embossed cavity forming a moulding wall 109 of the flared pocket 10 and cells 16 for receiving the bosses 17, with a radially expandable head 110 for moulding the chamber 9 as an undercut. The radially expandable head 110 emerges axially out of the moulding wall 109, and is a component of a retractable member 111 which is mounted in conjunction with the base 103 on a common frame 112.

The retractable member 111, and more particularly the head 110 comprised therein, can be manoeuvred by a piston 113 using a relative displacement between the retractable member 111 and the piston 113. The retractable member 111 is arranged as a tube which is mounted on a frame 112 by being oriented along the axis A2 of general orientation of the mould 101 and axially passing through the base 103. The arrangement as a tube of the retractable member 111 forms an axial channel 114 for the circulation of the piston 113, to induce the change thereof between the retracted and deployed positions thereof. In the retracted position of the retractable member 111, the expandable head 110 is retracted in a demoulding position as illustrated in FIG. 4; in the deployed position of the retractable member 111, the head 110 is expanded by being axially passed through by the piston 113 in a moulding position, as shown in FIG. 5. The piston 113 is carried by a base that can be moved by motorised manoeuvring means, such as an electric cylinder or similar motor member. These motorised manoeuvring means are used to move the base 103 between the opening and closing positions of the mould 101, and more particularly to move the mobile unit 120 composed of the base bearing the frame 112, which in turn bears the base 103 and the retractable member 111 passing through same axially. The base is provided with columns for the axial guiding of the frame 112 bearing the base 103 and the retractable member 111, which engage with bushes formed in the frame 112. Deformable return means 119 are inserted between the frame 112 and the base, whereon they are in antagonistic engagement. Such return means 119 are suitable for consisting of springs, pneumatic cylinders or any other member for retaining against a relative displacement between the frame 112 and the base beyond a predetermined constraint threshold.

This type of mould, though perfectly effective, has particularly a large axial size which does not facilitate the insertion thereof in a conventional blow-moulding line.

Moreover, the method implementing this mould is not suitable for attaining rates equivalent to those obtained with conventional container moulding methods.

SUMMARY OF THE INVENTION

As such, the present invention particularly relates to a base for a mould, for a clippable container, comprising on the upper face thereof, a wall for moulding the bottom of the container to be obtained, from which a head emerges extending along a longitudinal axis A2, said head comprises a peripheral surface comprising at least one blind opening, characterised in that the portion of said peripheral surface in line with said blind opening can move between a forward position, wherein said portion is aligned with the rest of said peripheral surface, and a rear position, wherein said portion is set back from the axis parallel to the axis A2 and passing through the bottom of said blind opening.

Within the scope of the present invention, the term "set back from the axis parallel to the axis A2 passing through the bottom of said blind opening" denotes that said wall portion is arranged between the axis A2 and the axis parallel to the axis A2 passing through the bottom of said blind opening.

The presence of one or a plurality of blind openings enables the creation of the shoulders responsible for clipping the container. The existence of said mobile portions in line with these openings enables the axial retraction of the moulded container without the shoulder being held inside said openings.

According to one preferred embodiment, said head has a cylindrical or tapered shape comprising a peripheral surface and an upper face.

According to one preferred embodiment, said head comprises at least two blind openings, arranged along the same plane perpendicular to the axis A2, positioned facing one another, at the base of said head.

According to one preferred embodiment, said head is hollow and contains all or part of a central core, movable in translation parallel to the axis A2, between a high position and a low position, arranged such that the movement of said central core from the high position to the low position actuates the movement of said portion in line with said blind opening from the forward position to the rear position.

According to one preferred embodiment, said central core and the internal surface of said mobile portion each have an inclined side towards the exterior of said base, relative to the axis A2, in contact with one another and joined by a first sliding link.

According to one particularly preferred embodiment, said first sliding link is embodied by a dovetail assembly.

According to one preferred embodiment, said central core extends below the base of said head inside a channel.

According to one preferred embodiment, said base comprises a push-button, movable in translation towards the axis A2, associated with said central core such that the movement of said push-button towards the axis A2 actuates the movement of said central core to the high position.

According to one more preferred embodiment, said push-button and said central core are joined by a second sliding link.

According to one particularly preferred embodiment, said second sliding link is embodied via at least one inclined guiding line, relative to the plane perpendicular to the axis A2, towards said axis A2.

According to one preferred embodiment, said central core has wings extending towards the exterior of said channel, said wings being joined by said sliding link to said push-button.

The presence of this push-button actuating the central code makes it possible to obtain a particularly compact base, with little extension in the axis relative to the moulding device of the prior art. This makes it possible to incorporate the base according to the invention into conventional blow-moulding lines without modifications.

According to one preferred embodiment, the free end of said push-button projects from the periphery of the rest of said base.

The invention also relates to a mould comprising a base according to any one of the preceding claims and shells laterally movably mounted about said axis A2, between an open position and a closed position, said shells each comprising a hollow cavity defining a portion of the wall of the container to be obtained, characterised in that, in the closed position, said shells bear on said push-button.

According to one preferred embodiment, said mould comprises two shells pivotally mounted in relation to one another.

DESCRIPTION OF THE EMBODIMENTS

Figure 1:
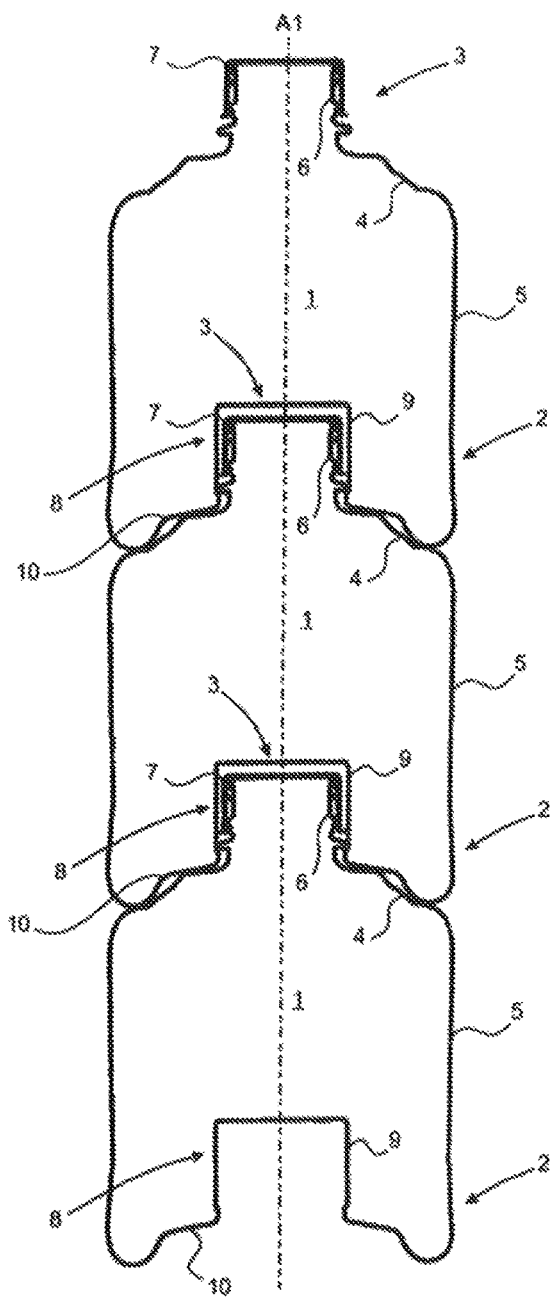
FIG. 1 is an axial cross-section illustration of a modular receptacle composed of a plurality of containers axially assembled together by nesting according to the prior art.
Figure 2:
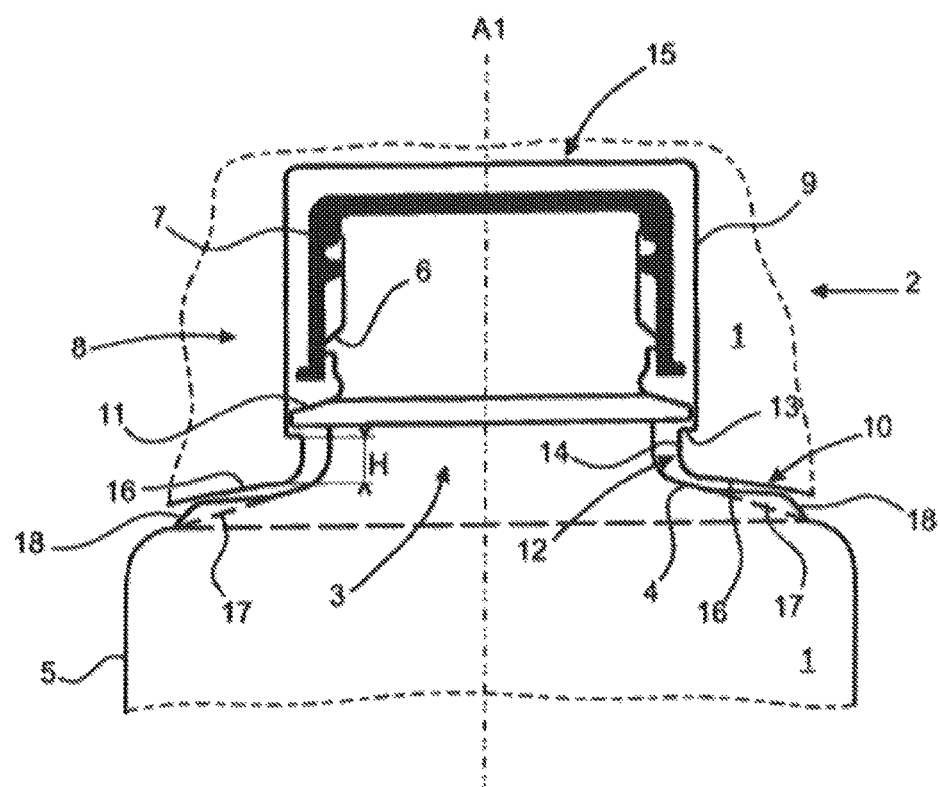
FIG. 2 is a detail of the receptacle shown in FIG. 1, illustrating the engagement between the bottom of a container and the neck of an adjacent container.
Figure 3:
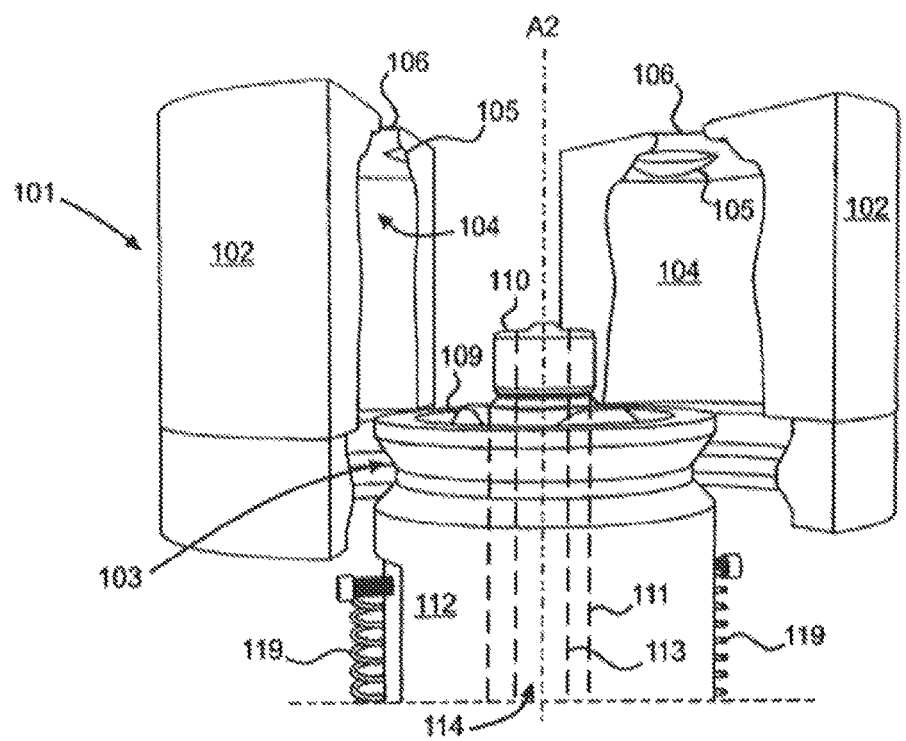
FIG. 3 is a perspective illustration of a mould, according to the prior art, used to form by blow-moulding a preform a container represented in FIG. 1 to FIG. 2.
Figure 4:
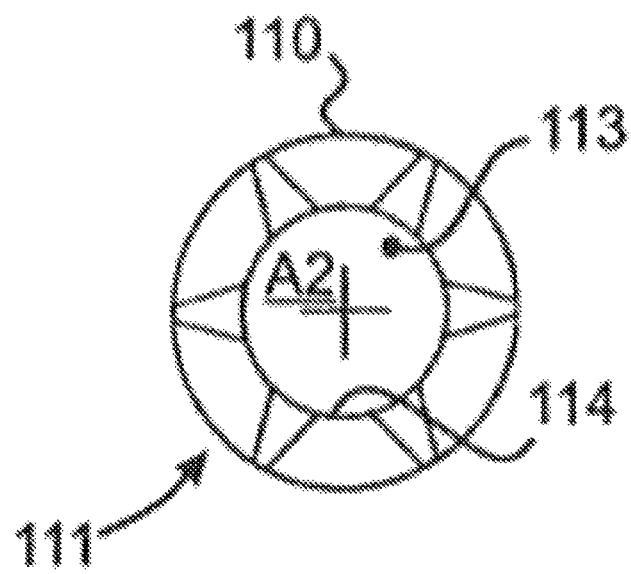
FIG. 4 and FIG. 5 are transversal cross-section illustrations of an expandable mould head in the retracted position and in the expanded position respectively, for forming an annular chamber as an undercut comprised by a container shown in FIGS. 1 and 2.
Figure 5:
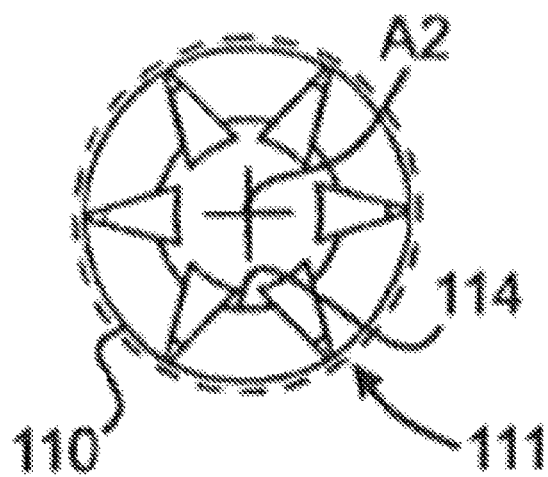
Figure 6:
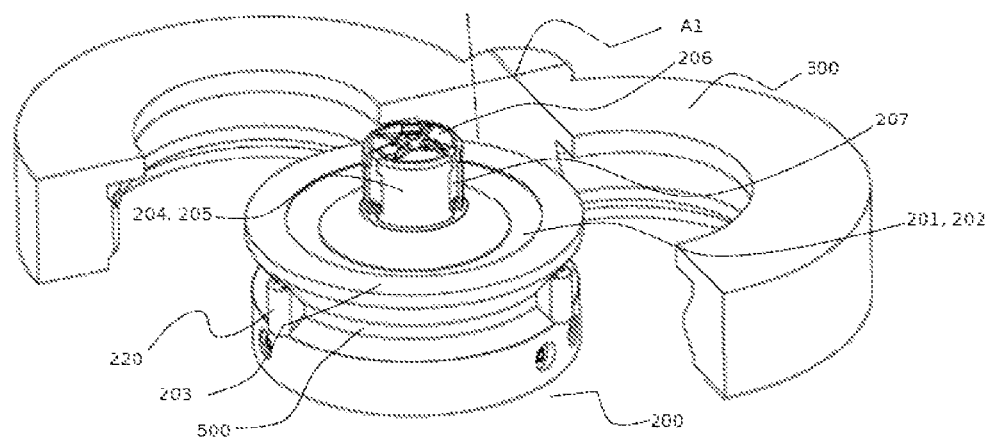
FIG. 6 shows a perspective view of one embodiment of a mould according to the invention.
Figure 7:
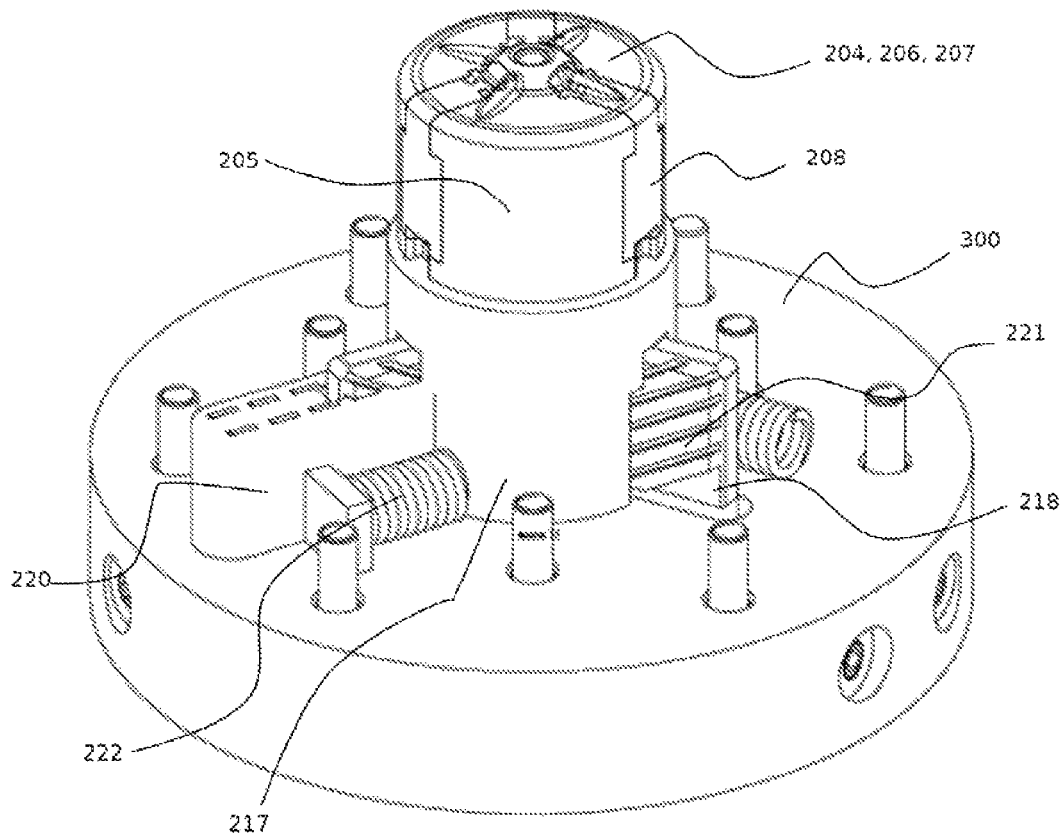
FIG. 7 shows a perspective view of the base of the embodiment shown in FIG. 6.
Figure 8:
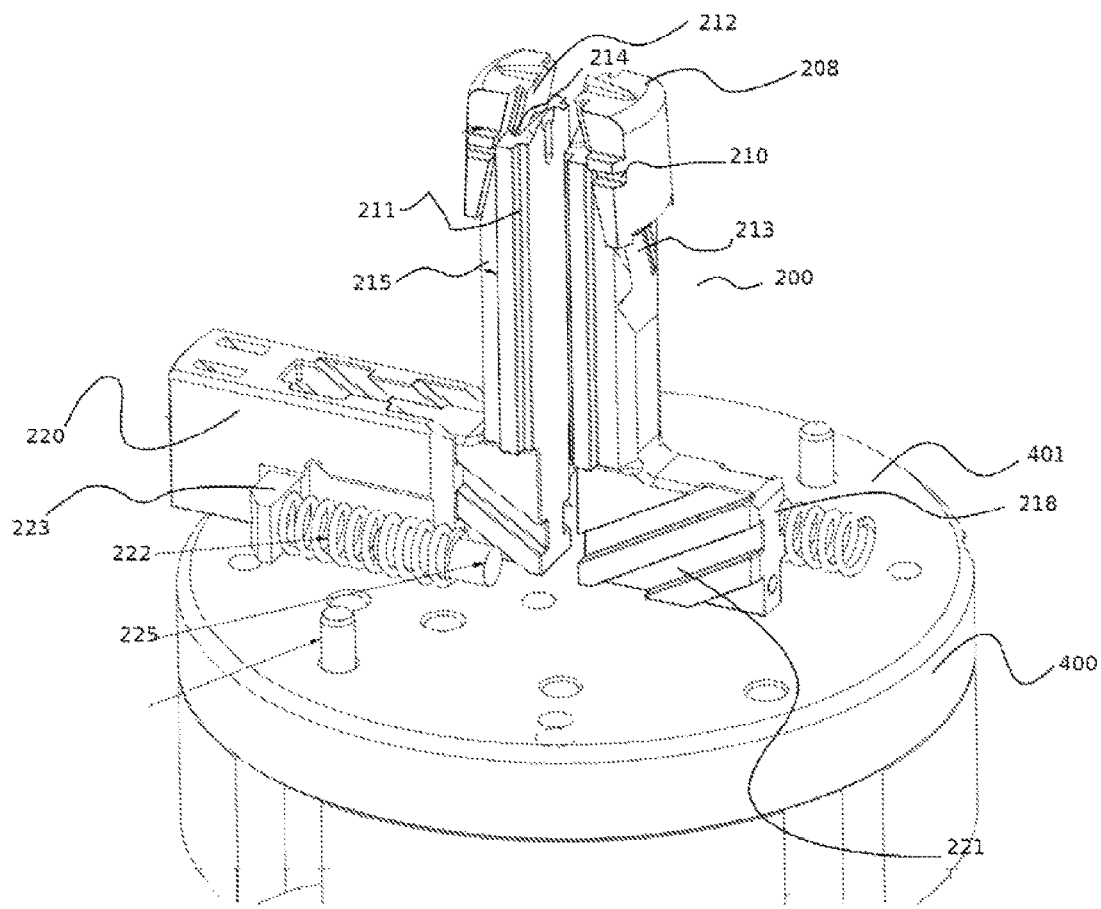
FIG. 8 shows a perspective view of the association between the central core, the frame, the push-button and the mobile portions of one embodiment of a base according to the invention.
Figure 9A:
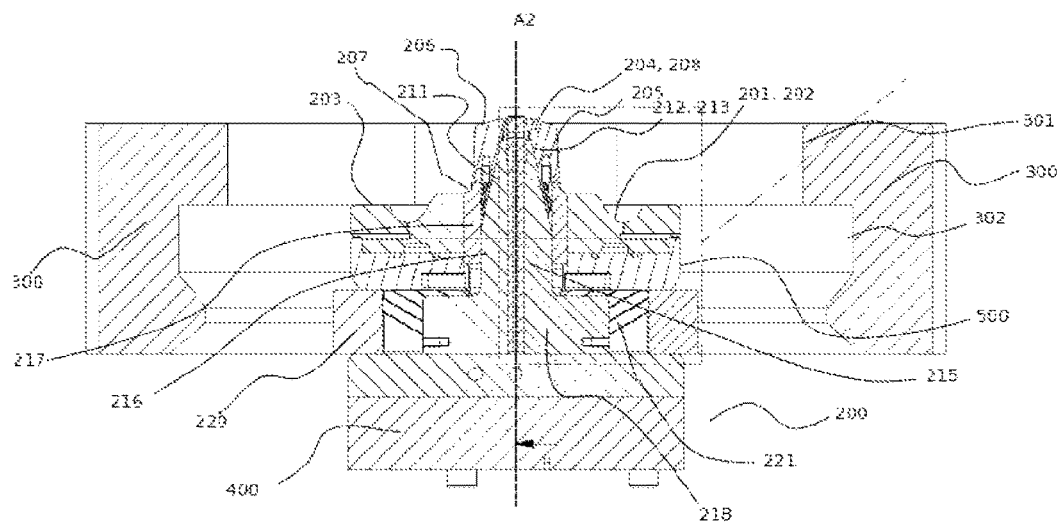
FIGS. 9a and 9b show a cross-section view of one embodiment of a mould according to the invention with the shells in the open (9a) and closed (9b) position.
Figure 9B:
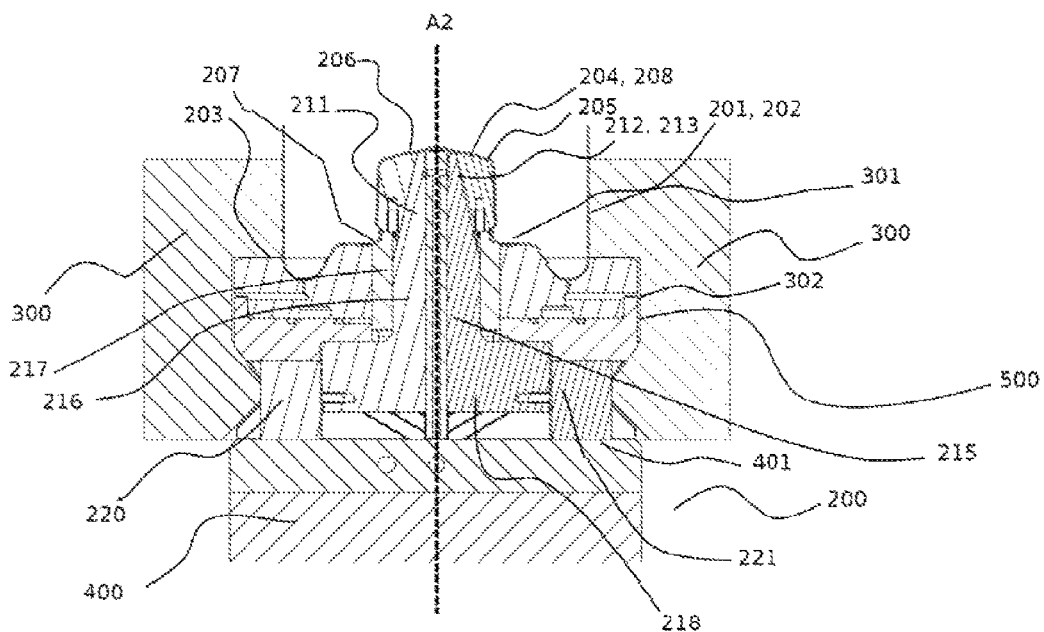

With reference to FIGS. 6-9, the mould according to the invention comprises a base 200 comprising on the upper face 201 thereof a moulding wall 202 forming the hollow cavity of all or part of the bottom of the container to be obtained. Preferentially, said upper face 201 is circular and comprises successively, from the periphery towards the centre thereof, a plane annular zone 203, suitable for receiving the shells 300 comprising the cavity of the rest of the container to be obtained, followed by the moulding wall 202 and the head 204 intended for moulding the chamber 9.

The moulding wall 202 and the head 204 can be co-moulded or permanently assembled. However, the head 204 can advantageously form a separate part to be inserted into an opening placed at the centre of the moulding wall 202. In the latter case, the moulding wall 202 and the head 204 can be joined by securing these two parts onto a frame 400.

The frame 400 preferentially has a cylindrical shape comprising a plane upper face 401 whereon the various elements of the base 200 (moulding wall 202, head 204, etc.) are to be attached. Moreover, a peripheral shell 500 can be advantageously used to isolate the space between said frame 400 and said upper surface 201 from the environment thereof.

The head 204, placed at the centre of the upper face 201 extends from the moulding wall 202 along a longitudinal axis A2 which is also the axis of general orientation of the mould according to the invention and of the container to be obtained. This head 204 is preferentially cylindrical or tapered in shape, wherein the axis of revolution is the axis A2, comprising a peripheral surface 205 and an upper face 206. The upper face 206 can advantageously comprise cavities intended to form ribs in the bottom of the container to be moulded.

The head 204 comprises on the peripheral surface thereof at least one blind opening 207 intended to form a shoulder 12 arranged in the chamber 9 of the container to be obtained. Advantageously, the peripheral surface 205 comprises 2 or 3 blind openings 207 evenly distributed at the base of the head 204. Advantageously, the blind openings 207 are arranged along the same plane perpendicular to the axis A2. The blind opening 207 preferentially has a parallelepipedic volume but any other shape can be used within the scope of the present invention.

The peripheral surface 205 of the head 204 comprises mobile portions 208 framed by fixed portions 209. The fixed portions 209 extend from the base of the head 204 and will advantageously also form the upper face 206 of the head 204.

Each mobile portion 208 is arranged in line with a blind opening 207 and will advantageously form the upper edge and even more advantageously all or part of the lateral edges thereof. The mobile portion 208 exhibits along the entire height thereof a width at least equivalent to that of the blind opening 207.

The mobile portion 208 can move between a first position, or forward position, wherein the mobile portion 208 is aligned with the rest of said peripheral surface 209, and a rear position wherein the mobile portion 208 is set back from the axis parallel to the axis A2 and passing through the bottom of said blind opening 207. For the purposes of clarity, it is specified that, in the forward position, the mobile portions 208 and the fixed portions 209 of the head 204 are aligned so as to form the cavity of the chamber 9 and the shoulders 12 of the container to be obtained. In the rear position, the portion of mobile portion 208 is set back from the bottom of the blind opening 207 which will enable the axial clearance of the container obtained without the shoulders 12 being held by the upper edge of the blind opening 207.

The movement of the mobile portion(s) 208 is advantageously guided by at least one guiding line 210 (preferentially grooves). The latter is advantageously arranged on a lateral face of the mobile portion 208 and engages with a congruent shoulder present on the adjacent surface of the head or conversely.

The radial movement of the mobile portions 208 of the peripheral surface 205 is generated by a central core 211. The latter is arranged completely or partially inside the head and can be moved in translation, parallel to the axis A2, between a high position and a low position. For the purposes of clarity, it is specified that the high and low positions are defined relative to the elevation of the central core 211 relative to the base of the head 204.

The base 200 according to the invention can comprise one or a plurality of central cores 211. For example, according to a first embodiment, each central core 211 can engage with a single mobile portion 208. According to a second embodiment, a single central core 211 can engage with all the mobile portions 208 of the head.

The movement of said central core 211 from the high position to the low position actuates the movement of the mobile portion 208 from the forward position to the rear position.

Those skilled in the art are capable of envisaging all the means for associating the central core 211 with the mobile portion 208 so as to convert the axial movement of the central core 211 to a radial movement of the mobile portion 208. It is notably possible to envisage devices comprising rods or cams.

According to one preferred embodiment of the invention, the central core 211 and the internal surface of the mobile portion 208 each have an inclined side 212, 213 towards the exterior of said base 200, relative to the axis A2, in contact with one another and joined by a sliding link obtained by a dovetail assembly 214 between the two inclined sides 212, 213. Within the scope of the present invention, the terms "internal" and "external" are chosen with reference to the distance relative to the axis A2.

In the high position, the two inclined sides 212, 213 have a maximum contact surface area. When changing to the low position, the central core 211 slides along the inclined side 212 of the internal surface of the mobile portion 208 and actuates the latter towards the axis A2 to the rear position thereof. The return of the central core 211 to the high position involves the mobile portion 208 travelling the reverse path.

In addition to the inclined side 213 thereof, the central core 211 comprises a longitudinal member 215 associated with said inclined side 213 and extending into the head 204 along an axis parallel to the axis A2. Preferentially, said central core 211, and more particularly said longitudinal member 215, extends below the base of said head inside a channel 216. The latter channel 216 is advantageously formed inside a cylindrical part 217 extending the head 204 below the moulding wall 202. Advantageously, this cylindrical part 216 is directly associated with the frame 400 of the base 200.

Moreover, the central core 211 can advantageously comprise at least one wing 218 extending radially towards the exterior of the base 200. Preferentially, all or part of said wing 218 is projected outside the cylindrical part 217 via an opening. This wing 21—will enable the interaction of the central core 211 with further parts of the base 200 according to the invention and actuate the movement of this central core 211 between the high position thereof and the low position thereof. When the central core 211 is in the low position, the wing rests preferentially on the upper face 401 of the frame 400.

Finally, the base 200 according to the invention can also comprise at least one push-button 220, movable in translation towards the axis A2, associated with said mobile core 211 such that the movement of said push-button 220 towards the axis A2 actuates the movement of said central core 211 to the high position. Those skilled in the art are capable of determining the means to be implemented to associate the push-button 220 with the central core 211. Of these, mention can notably be made of rods and cams.

Preferentially, the push-button 220 and the central core 211 are associated by a second sliding link embodied via at least one guiding line 221 inclined towards said axis A2. It is thus understood that the radial movement of the push-button 220 towards the axis A2 will actuate the movement of the central core 211 in the high position.

The push-button 211 advantageously has a lower face resting on the upper face 401 of the frame 400 and a free end projecting from the peripheral wall 500 of the base 20 when the central core 211 is in the low position. Moreover, the push-button 220 comprises two strips forming a separating gap, open at the end opposite said free end, suitable for receiving all or part of the wing 218 of the central core 211. These strips comprise on the internal face thereof at least one guiding means congruent with at least one guiding means present on the external face of the central core providing the second sliding link. These guiding means can notably take the form of a groove and/or shoulder. Alternatively, said push-button 220 can comprise a single strip, extending towards the axis A2, and inserted between two wings of the central core 211.

In order to enable the return of the elements of the base 200 to a position wherein the central core 211 is in the low position and the mobile portion 208 in the rear position, said base 200 further comprises elastic means suitable for moving the push-button 220 towards the exterior of the base. These elastic means can advantageously take the form of a spring 222 placed between a first abutment 223 rigidly connected to the push-button 220 and a second abutment 224 secured to the frame. The spring 222 can be held in position by a rod 225 extending from the first abutment 223.

Preferentially, the various elements of the base 200 according to the invention can each comprise at least one bore forming at least one channel passing through these elements and making it possible to circulate a fluid suitable for cooling the mould during the use thereof.

The mould according to the invention further comprises shells 300 wherein the internal face comprises a hollow cavity 301 intended to form the walls of the container to be obtained. Moreover, these shells 300 also comprise a congruent zone 302 to the annular zone of the upper face of the base and to the peripheral wall 500 of the base 200.

These shells 300 are laterally movably mounted about the axis A2, between an open position and a closed position. These two shells 300 can be free relative to one another or preferentially joined by a swivel link, about an axis A1 parallel to the axis A2.

In the closed position, the shells 300 surround the base 200 according to the invention, thus forming the cavity of the entire container. During this step, the shells 300 bear on the push-button 220 which causes the central core 211 to change to the high position and the mobile portion to the forward position. The blow-moulding of the preform can be initiated and a container is obtained notably comprising shoulders 12 placed inside blind openings 207.

The change of the shells 300 from the closed position to the open position actuates the movement of the push-buttons 220 outwards, under the effect of the elastic means 222, and thus the return of the central core 211 to the low position and of the mobile portion 208 to the rear position. In doing so, the upper edge of the blind openings 207 no longer blocks the axial movement of the container obtained which can be separated from the head 204.

The present invention also relates to a method for producing a container comprising the use of a base 300 or a mould according to the invention.

The invention claimed is:

1. A base for a mould for a clippable container, comprising:
   on the upper face thereof, a wall for moulding the bottom of the clippable container to be obtained;
   a head extending from said wall along a longitudinal axis (A2), said head comprising a peripheral surface having at least one blind opening and at least one mobile portion,
   and a push button,
   wherein the at least one mobile portion of said peripheral surface can move between a forward position, wherein said mobile portion is aligned with the rest of said peripheral surface, and a rear position, wherein said mobile portion is set back from the axis parallel to the longitudinal axis (A2) and passing through the bottom of said blind opening,
   wherein said head is hollow and contains all or part of a central core, said central core being movable in translation, parallel to the longitudinal axis (A2), between a high position and a low position, and arranged such that the movement of said central core from the high position to the low position actuates the movement of said mobile portion from the forward position to the rear position,
   wherein an external surface of said central core and an internal surface of said mobile portion each have an inclined side towards the exterior of said base relative to the longitudinal axis (A2), in contact with one another and joined by a sliding link,
   wherein said sliding link is a dovetail assembly,
   wherein said central core extends below the base of said head inside a channel, and
   wherein the push-button is movable in translation towards the longitudinal axis (A2), and associated with said central core such that movement of said push-button towards the longitudinal axis (A2) actuates movement of said central core to the high position.

2. The base according to claim 1, wherein said head has a cylindrical or tapered shape and an upper face.

3. The base according to claim 1, wherein said head comprises at least two blind openings, arranged along the same plane perpendicular to the longitudinal axis (A2), positioned facing one another, at the base of said head.

4. The base according to claim 1, wherein said push-button and said central core are joined by a second sliding link.

5. The base according to claim 4, wherein said second sliding link comprises at least one inclined guiding line towards said longitudinal axis (A2).

6. The base according to claim 4, wherein said central core has wings extending towards an exterior of said channel, said wings being joined by said second sliding link.

7. The base according to claim 1, wherein a free end of said push-button projects from a periphery of said base.

8. The base according to claim 1, further comprising:
shells laterally movably mounted about said longitudinal axis (A2), between an open position and a closed position, said shells each comprising a hollow cavity defining a portion of a wall of the clippable container to be obtained, wherein, in the closed position, said shells bear on said push-button.

9. The base according to claim 1, further comprising:
two shells pivotally mounted in relation to one another.

* * * * *